US012779733B2

(12) United States Patent
Lehmann et al.

(10) Patent No.: US 12,779,733 B2
(45) Date of Patent: Nov. 3, 2026

(54) TRUCK-MOUNTED CONCRETE PUMP

(71) Applicant: SCHWING GMBH, Herne (DE)

(72) Inventors: Andreas Lehmann, Moers (DE); Uwe Krischan, Herne (DE); Karl-Heinz Schwedhelm, Castrop-Rauxel (DE); Johannes Henikl, Dorsten (DE); Roland Schink, Herne (DE); Reiner Vierkotten, Oberhausen (DE)

(73) Assignee: SCHWING GMBH, Herne (DE)

( * ) Notice: Subject to any disclaimer, the term of this patent is extended or adjusted under 35 U.S.C. 154(b) by 935 days.

(21) Appl. No.: 18/021,108

(22) PCT Filed: Aug. 6, 2021

(86) PCT No.: PCT/EP2021/071995
§ 371 (c)(1),
(2) Date: Feb. 13, 2023

(87) PCT Pub. No.: WO2022/033973
PCT Pub. Date: Feb. 17, 2022

(65) Prior Publication Data
US 2023/0302682 A1 Sep. 28, 2023

(30) Foreign Application Priority Data
Aug. 13, 2020 (DE) ..................... 10 2020 121 350.6

(51) Int. Cl.

| | |
|---|---|
| ***B28C 5/42*** | (2006.01) |
| ***E04G 21/04*** | (2006.01) |
| ***F15B 11/17*** | (2006.01) |
| ***F15B 15/18*** | (2006.01) |
| ***H02K 7/14*** | (2006.01) |

(52) U.S. Cl.
CPC ........ *B28C 5/4213* (2013.01); *E04G 21/0436* (2013.01); *F15B 11/17* (2013.01); *F15B 15/18* (2013.01); *H02K 7/14* (2013.01)

(58) Field of Classification Search
CPC .......................... B28C 5/4213; E04G 21/0436
See application file for complete search history.

(56) References Cited

U.S. PATENT DOCUMENTS

2021/0323463 A1 * 10/2021 Kasten ...................... B60P 3/16

FOREIGN PATENT DOCUMENTS

JP 2011163072 A 8/2011
WO 2020048745 A1 3/2020

OTHER PUBLICATIONS

International Search Report and Written Opinion issued in application PCT/EP2021/071995, mailed Nov. 9, 2021, 7 pages (English Translation).

* cited by examiner

*Primary Examiner* — Elizabeth Insler
(74) *Attorney, Agent, or Firm* — Faegre Drinker Biddle & Reath LLP

(57) ABSTRACT

A hydraulically driven concrete pump system includes a distribution boom, a support system, and a concrete pump. A first hydraulic pump is configured to drive the concrete pump, and a combustion drive engine is configured to drive the first hydraulic pump. A second hydraulic pump is configured to drive the distribution boom and/or the support system, and an electric motor is configured to drive the second hydraulic pump.

12 Claims, 8 Drawing Sheets

TRUCK-MOUNTED CONCRETE PUMP

CROSS-REFERENCE TO RELATED APPLICATION

Figure 1:
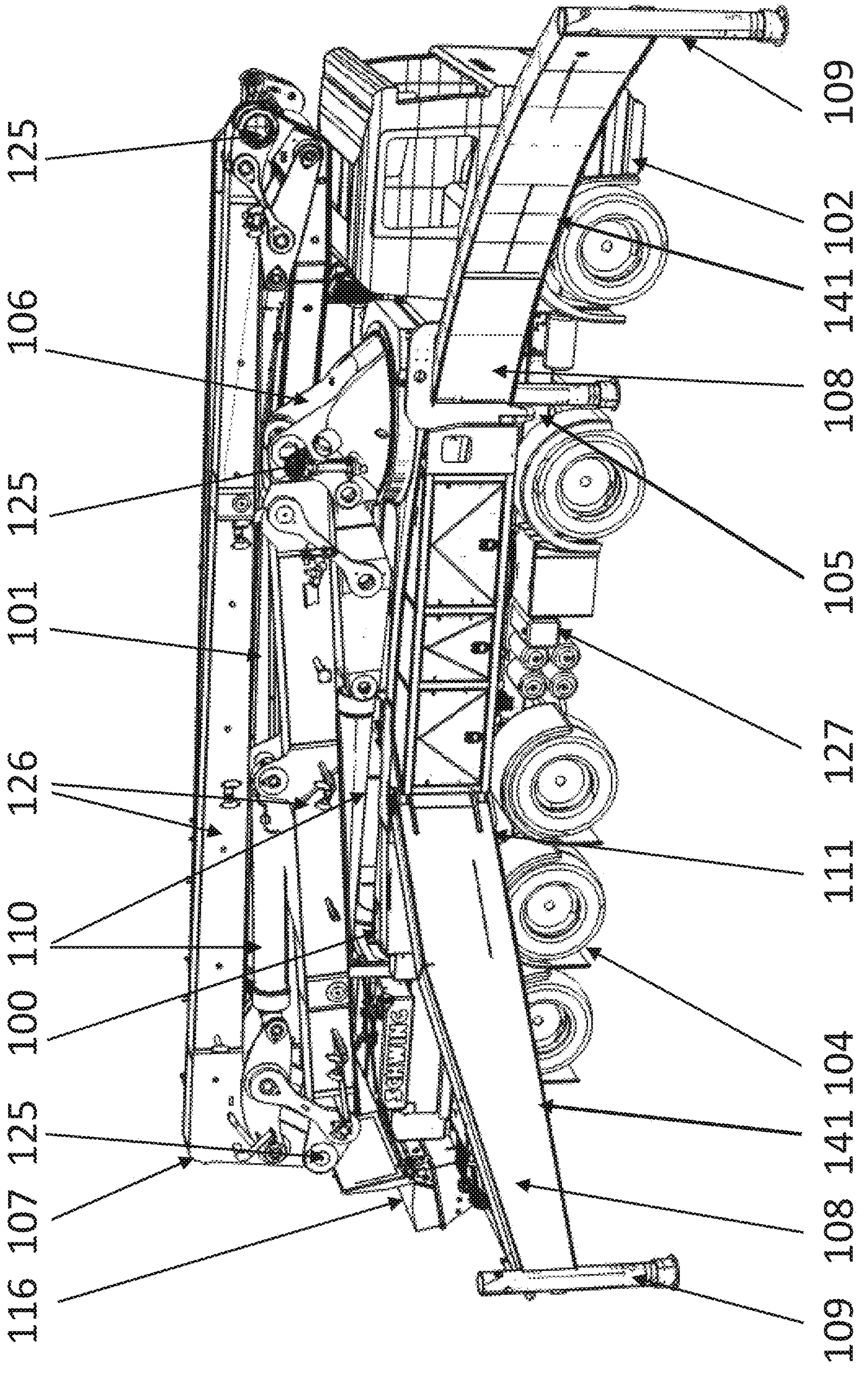

This application is a national stage application of International Application No. PCT/EP2021/071995, filed 6 Aug. 2021, which claims priority to German Patent Application No. 10 2020 121 350.6, filed 13 Aug. 2020, both of which are herein incorporated by reference in their entireties.

The invention relates to a truck-mounted concrete pump with a truck chassis, with a combustion engine for transporting the truck-mounted concrete pump and a hydraulically driven concrete pump superstructure with a distribution boom, a support system and a concrete pump for pumping and distributing fresh concrete.

In today's truck-mounted concrete pumps, a hydraulic pump train, consisting of several hydraulic pumps arranged in series, drives the units of the concrete pump superstructure, for example the concrete pump, the distribution boom, the support system and other units required for operation, is usually driven on the construction site by a diesel engine of the truck chassis.

To reduce the emission of undesirable exhaust gases and climate-damaging carbon dioxide, it is desirable to also drive truck-mounted concrete pumps on the construction site electrically.

In the case of an electrically or hybrid (diesel and electric) driven truck-mounted concrete pump, the problem is that the electrical power provided by an on-board battery and/or a power supply on the construction site is generally not sufficient to drive the truck-mounted concrete pump electrically for the concrete pumping/conveying process sufficiently or for a sufficiently long period of time.

Because purely electric operation of a truck-mounted concrete pump is not possible for this reason, or is at least severely restricted, it would nevertheless be desirable to limit the running time of the diesel engine driving the truck-mounted concrete pump on the construction site as far as possible in order to keep the emission of exhaust gases and noise pollution to a minimum.

A truck-mounted concrete pump with a hybrid drive is described, for example, in patent application DE 10 2018 214 965 A1. According to this patent application, the electric motor and the diesel engine can drive a common hydraulic pump train either alternately or together.

This would make it possible, for example, to set-up and dismantle the concrete pump electrically, i.e., to extend the support systems, unfold the boom, clean the concrete pump, fold in the boom and retract the support system, and to use the diesel engine during pumping operation or connect it to the electric motor.

However, the set-up and dismantling of the truck mounted concrete pump according to this document would be very ineffective, because the electric motor always drives the entire hydraulic pump train, i.e. also the hydraulic pumps for concrete pump operation, even if they are in idle mode.

Moreover, after the actual concreting work, the combustion engine remains in operation for a very long time for cleaning the concrete pump superstructure. The cleaning includes, for example, the suction of a cleaning body through the conveying pipe to remove residual concrete from the conveying pipe and the removal of concrete residues with a water hose or high-pressure cleaner. The cleaning work requires the concrete pump to be operated at least temporarily.

It is therefore the object of the invention to provide a truck-mounted concrete pump that solves the problems mentioned above.

This problem is solved by a truck-mounted concrete pump with the features of claim 1.

The invention proposes a truck-mounted concrete pump having a truck chassis with a combustion drive engine, wherein the combustion drive engine is configured to drive the truck-mounted concrete pump while driving. The truck-mounted concrete pump further comprises a hydraulically driven concrete pump superstructure, including a distribution boom, a support system, and a concrete pump for pumping and distributing fresh concrete. The truck-mounted concrete pump also has hydraulic pumps which are configured to drive the concrete pump superstructure, at least one hydraulic pump configured to drive the concrete pump and at least one further hydraulic pump configured to drive the distribution boom and/or the support system. The truck-mounted concrete pump is characterized in particular in that the combustion drive engine is configured to drive the at least one hydraulic pump, which in turn is configured to drive the concrete pump, and in that an electric motor is configured to drive the at least one hydraulic pump, which is configured to drive the distribution boom and/or the support system.

This means that the hydraulic pump train of a truck-mounted concrete pump according to the state of the art, which is made up of several hydraulic pumps, is divided into two parts with the combustion drive engine driving the hydraulic pump for concrete pump operation. An electric motor which drives the distribution boom or the support system can now be used very effectively, for example to perform the set-up and dismantling of the truck-mounted concrete pump on the construction site with a purely electric drive. The set-up of a truck-mounted concrete pump, i.e. the extension of the support system and the support legs and the unfolding of the distribution boom, takes about half an hour. Dismantling the truck-mounted concrete pump takes about the same amount of time. During these periods, the invention allows the concrete pump superstructure to be effectively powered electrically and there is no need to operate the combustion drive engine during this time. Only for the time of the actual concrete pumping process, which requires a lot of energy, the operation of the combustion drive engine is necessary.

Advantageous refinements and developments of the invention result from the dependent claims. It should be pointed out that the features listed individually in the claims can also be combined with one another in any technologically meaningful manner and thus show further refinements of the invention.

According to an advantageous embodiment, the truck-mounted concrete pump has a hydraulic switching unit configured to connect the distribution boom and the support system alternately to the hydraulic pump configured to drive the distribution boom and/or the support system. This makes it very easy to use the electric motor in conjunction with a hydraulic pump to support the truck-mounted concrete pump and to fold and unfold the distribution boom.

Preferably, the combustion drive engine is additionally configured to drive a hydraulic pump that is configured to drive a pipe switch. The fact that the combustion drive engine also drives the pipe switch which belongs to the concrete pump means that the drive energy of the combustion drive engine can be used effectively for the concrete conveying process.

According to an advantageous embodiment, the combustion drive engine is configured to drive a hydraulic pump which is configured to drive an agitator. Since the combustion drive engine also drives the agitator belonging to the concrete pump, the drive energy of the combustion drive engine can be used effectively for the concrete conveying process.

According to an advantageous embodiment of the invention, the electric motor is configured to drive the hydraulic pump, which is configured to drive the pipe switch. This embodiment allows the operation of the pipe switch by means of the electric motor, for example, in order to clean the pipe switch after the concrete conveying process, so that the combustion drive engine does not have to be switched on for cleaning the pipe switch.

According to an advantageous embodiment, the electric motor is also configured to drive the hydraulic pump, which is configured to drive the agitator, so that the agitator can also be driven purely electrically, for example for the cleaning at the end of concrete distribution.

Preferably, a hydraulic switching device is provided which connects the hydraulic pump configured to drive the distribution boom and/or the support system to the concrete pump. This switching device makes it possible to operate the concrete pump, in particular the differential cylinders of the concrete pump and thus the conveying cylinders of the concrete pump for cleaning operation, without the combustion drive engine having to be switched on for cleaning operation. According to an advantageous embodiment, the electric motor is supplied with power via an electrical switching device. This electrical switching device makes it possible to connect the electric motor to different power sources in a simple manner and to switch between these power sources as required.

In an advantageous embodiment, the electrical switching device is configured to connect an electrical energy storage to the electric motor. This electrical energy storage can, for example, be permanently arranged on the concrete pump superstructure and enables the electric motor to be easily supplied with electrical energy.

In an advantageous embodiment, the electrical switching device is configured to connect a power connection of the construction site to the electric motor. In this way, a simple and permanent power supply can be ensured by means of the switching device.

In an advantageous embodiment, the combustion drive engine is configured to drive an electricity generator. By means of such an electricity generator, for example, the electricity generated by the electricity generator can be used to charge the electrical energy storage unit while driving to and from the construction site.

In an advantageous embodiment, the generator is connected via a coupling to the hydraulic pump which is configured to drive the concrete pump. This coupling makes it possible to decouple the generator, which is connected between the combustion drive engine and the hydraulic pump which is configured to drive the concrete pump, from this hydraulic pump so that the hydraulic pump is not unnecessarily driven while the generator is driven.

In an advantageous embodiment, the generator is configured to drive the electric motor. If, for example, no construction site power supply is available at a construction site and/or the electrical energy storage on the truck-mounted concrete pump is discharged or not available, the truck-mounted concrete pump can be safely be set-up or dismantled if necessary.

Figure 2:
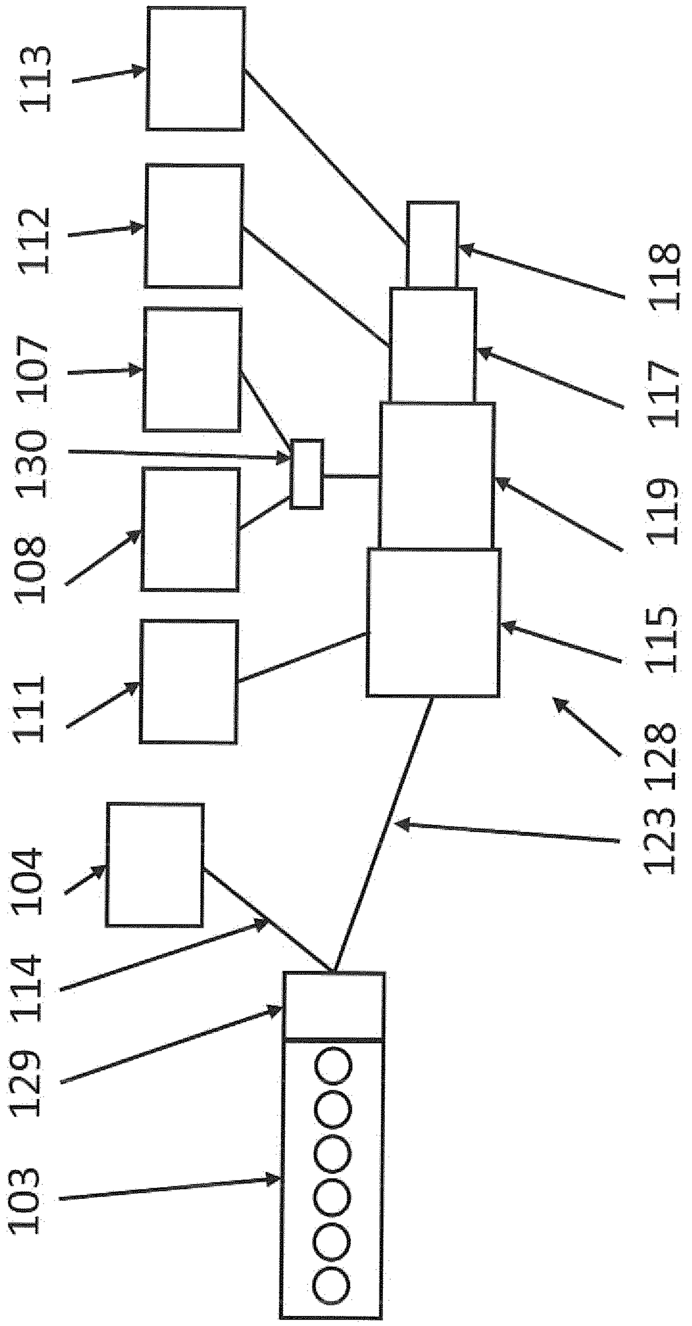
Figure 3:
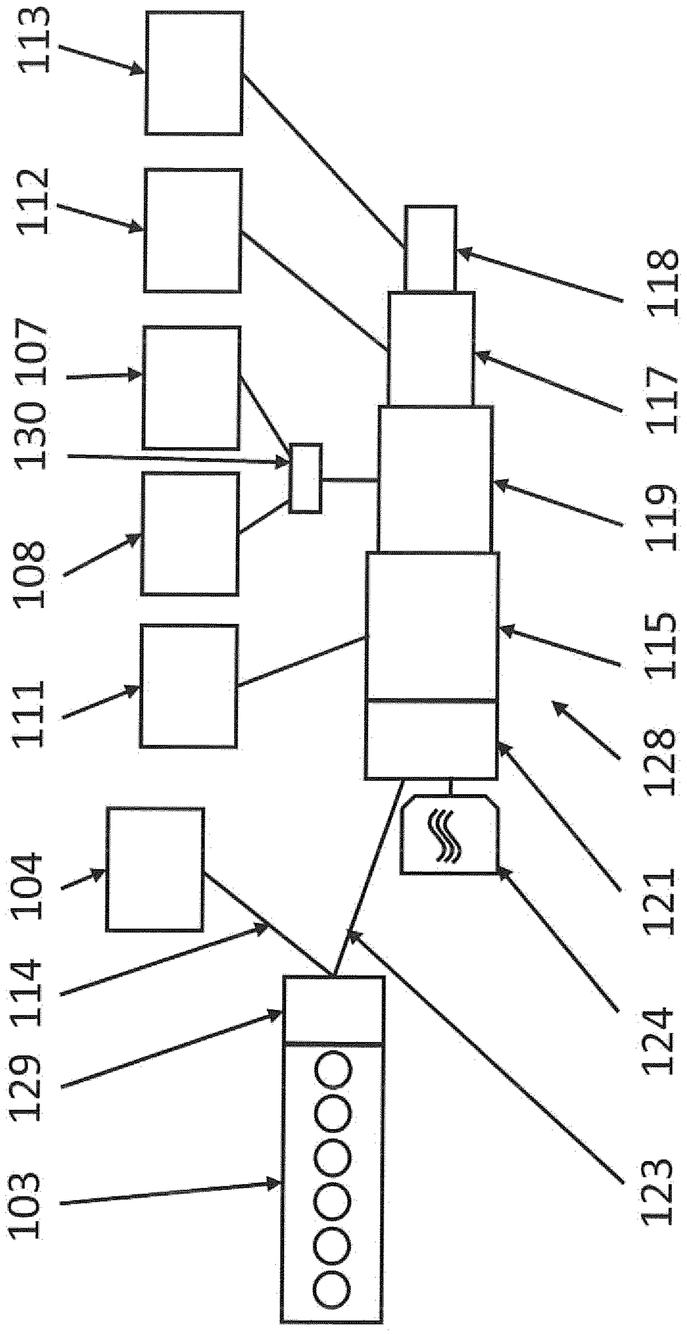
Figure 4A:
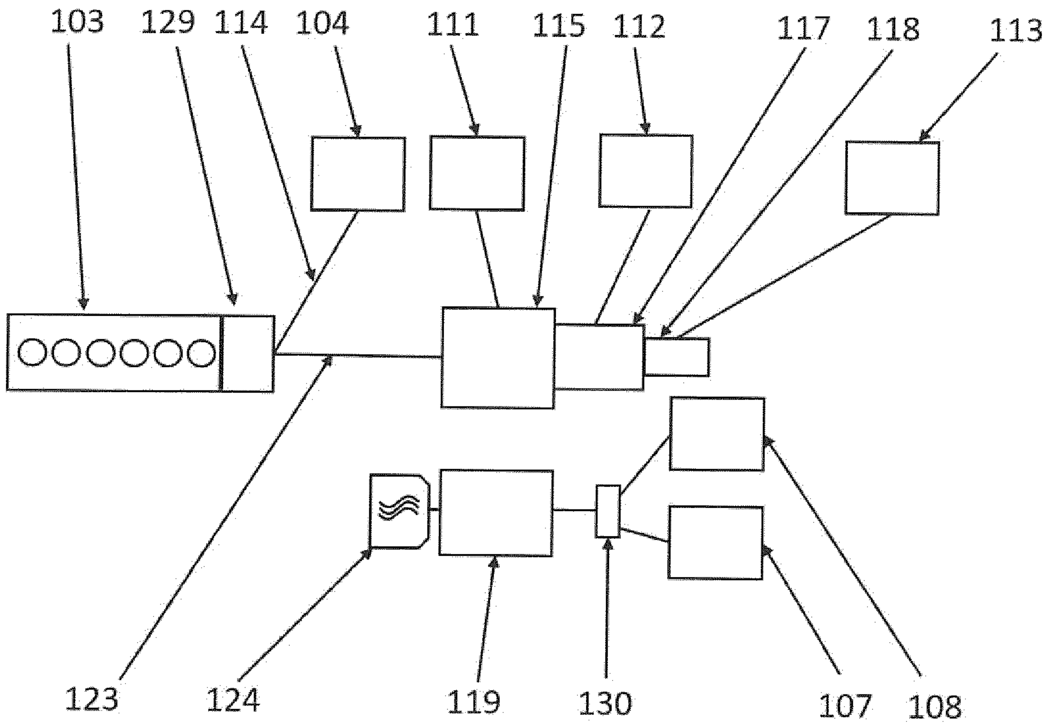
Figure 4B:
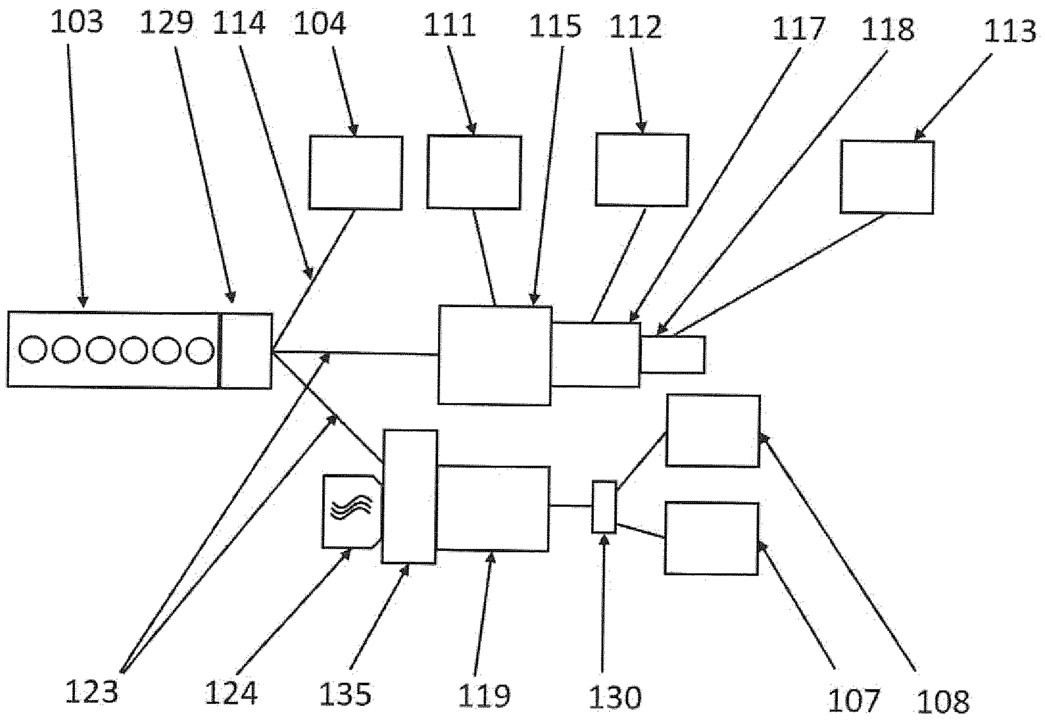
Figure 5:
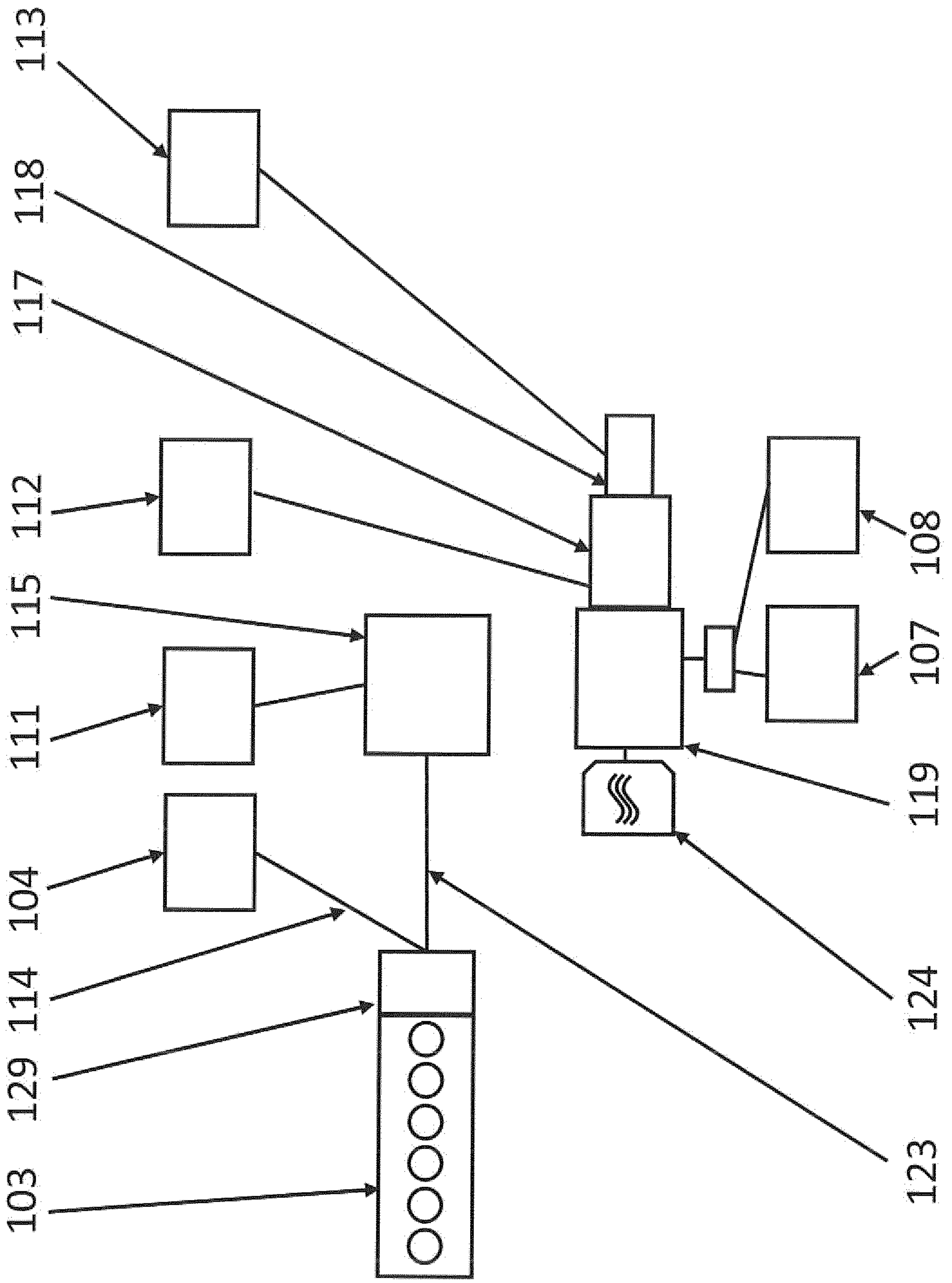
Figure 6:
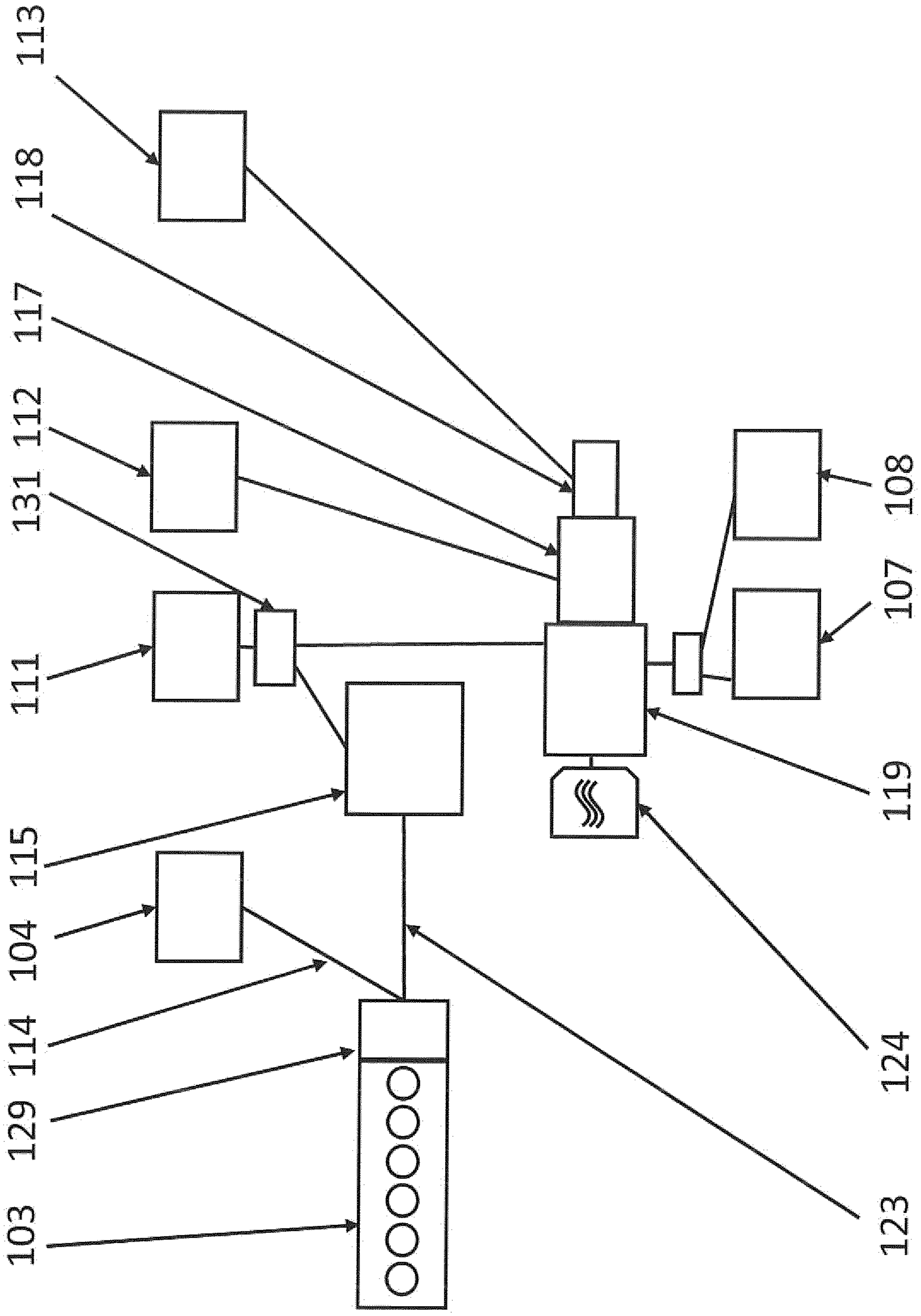
Figure 7:
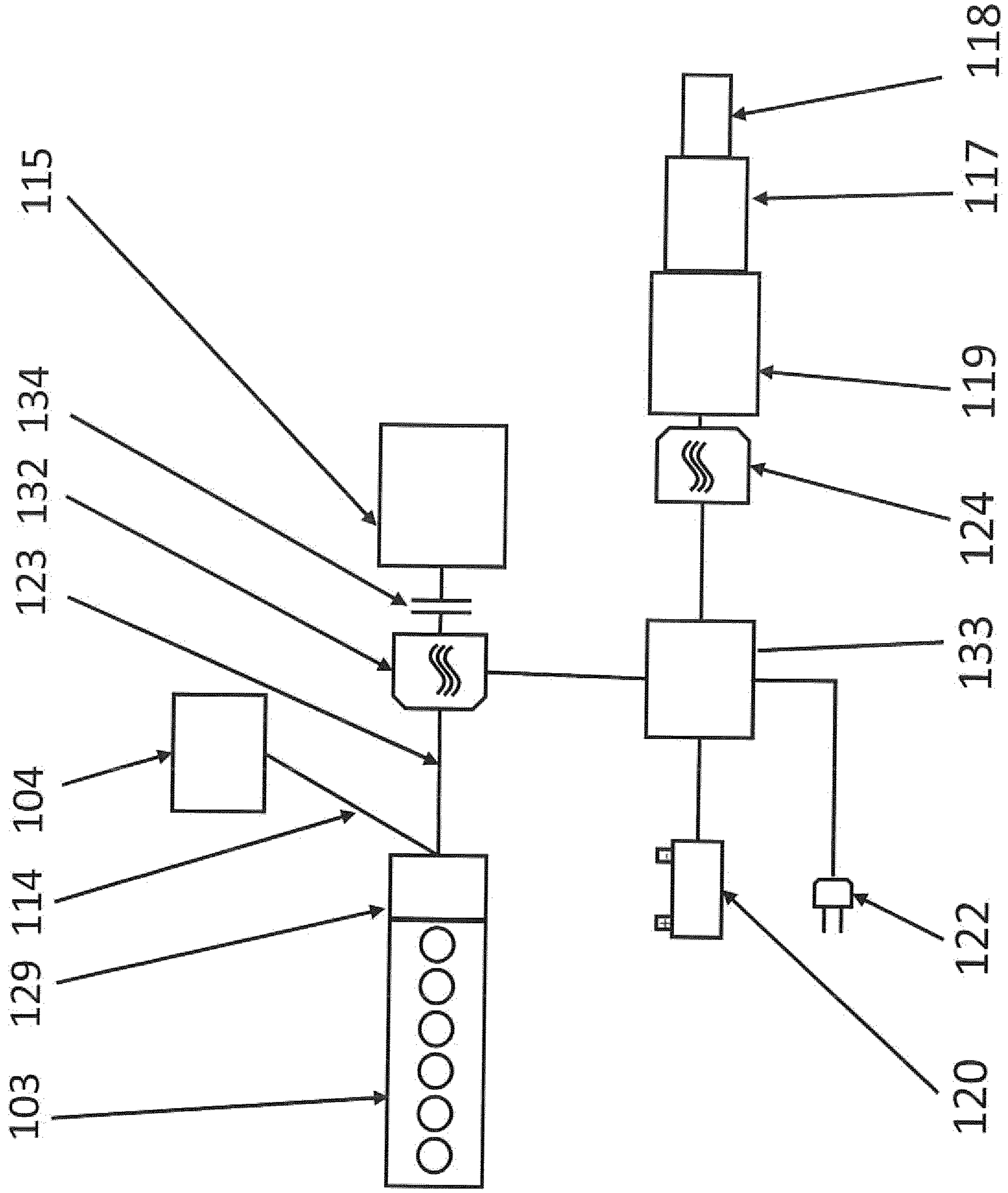

Further features, details and advantages of the invention will be apparent from the following description and from the drawings, which show examples of embodiments of the invention. Corresponding objects or elements are provided with the same reference signs in all figures. Showing:

FIG. 1 View of a truck-mounted concrete pump according to the invention,

FIG. 2 Drive scheme of a truck-mounted concrete pump according to the state of the art, FIG. 3 Variant of a drive scheme of a truck-mounted concrete pump according to the state of the art, FIG. 4*a*, 4*b* Drive scheme of a truck-mounted concrete pump according to the invention, FIG. 5 Drive scheme of a truck-mounted concrete pump according to the invention in a second embodiment, FIG. 6 Drive scheme of a truck-mounted concrete pump according to the invention in a third embodiment, FIG. 7 Drive scheme with an electrical power supply according to the invention, and FIG. 8*a-e* Variants of construction site power supplies for a truck-mounted concrete pump according to the invention.

A truck-mounted concrete pump 100 according to the invention is shown in FIG. 1. The truck-mounted concrete pump 100 has, in particular, a truck 102 with a chassis 104 driven by a combustion engine 103 (see FIG. 4) on which a concrete pump superstructure 101 is arranged. The concrete pump superstructure 101 essentially has a concrete pump substructure 127 with a support system 108 with hydraulically driven support system cylinders 109 and foldable or extendable support struts 141 and a hydraulically driven concrete pump 111. At its rear end, the concrete pump substructure 127 carries a feed hopper 116 for liquid fresh concrete, in which an agitator 113 driven by a hydraulic motor stirs the fresh concrete, for example filled in by a truck mixer. A hydraulically driven pipe switch 112 (see FIG. 4) is arranged in the lower area of the feed hopper 116. The concrete pump substructure 127 also contains the hydraulic pumps 115, 119, 117, and 118 (see FIG. 4) for driving the aggregates of the concrete pump superstructure 101. The concrete pump substructure 127 is connected via a turntable 106 to a distribution boom 107, the individual boom segments 126 are connected via articulated joints 125 to each other. The distribution boom 107 or each of the articulated joints 125 are actuated by means of hydraulic cylinders 110. The hydraulic pressure for driving the hydraulic cylinders 110 of the distribution boom 107 and the support system 108 is provided by a hydraulic pump 119.

The concrete pump 111 is typically a two-cylinder piston pump (not shown) with two hydraulically driven differential cylinders and two conveying cylinders that alternately suck fresh concrete from the feed hopper 116 and pump it through the pipe switch 112 into a not shown conveying pipe, which extends along the unfolded distribution boom 107, thus distributing it on the job site.

FIG. 2 shows a drive scheme of a truck-mounted concrete pump or concrete pump supersctructure 101 according to the state of the art. For driving operation, a combustion engine 103 drives the chassis 104 via a transmission and a cardan shaft 114. For working operation, that is, for the set-up and dismantling of the truck-mounted concrete pump 100 and pumping operation on a construction site, the combustion engine 103 drives the hydraulic pumps 115, 117, 118 and 119 combined into a hydraulic pump train via the power take-off 123 of the transmission 129. Each of the hydraulic pumps 115, 119, 117 drives the subsequent hydraulic pump 119, 117, 118.

The hydraulic pump 115, which often also comprises two individual powerful hydraulic pumps arranged in series, drives in particular the differential cylinders of the concrete pump 111, which are not shown here, via a suitable hydraulic control system, which is not shown for reasons of clarity.

A further hydraulic pump 119 supplies either the distribution boom 107 or the support system 108 with hydraulic drive power via a first hydraulic switching unit 130. Here, too, the further details of the hydraulic control system are not shown for reasons of clarity. The use of only one hydraulic pump 119 is possible in particular because the distribution boom 107 may not be unfolded until the truck-mounted concrete pump 100 has been properly supported. On the other hand, after completion of the concreting work, the distribution boom 107 must first be completely folded in before the support system 108 can be retracted.

A further hydraulic pump 117 drives the pipe switch 112. For this purpose, the hydraulic pump 117 usually constantly charges a hydraulic pressure accumulator, which is not shown, which provides the energy for rapid switching of the pipe switch 112. For this reason, the hydraulic pump 117 is also referred to as an accumulator charging pump. Another hydraulic pump 118 is used to drive the hydraulic motor of the agitator 113 in the feed hopper 116. Further hydraulic pumps, e.g. for driving a hydraulic oil cooler and other units of the concrete pump superstructure 101, may be present, depending on the equipment of the concrete pump superstructure 101.

The shown size of the hydraulic pumps 115, 117, 118, 119 reflects the power of these pumps. I.e., the power of hydraulic pump 115 is usually greater than the power of hydraulic pump 119. The power of the following hydraulic pumps 117, 118 is usually less than that of the preceding hydraulic pumps.

FIG. 3 shows the drive scheme of a state-of-the-art truck-mounted concrete pump 100, in which the units of the concrete pump superstructure 101 can be driven either by a combustion drive engine 103 or an electric motor 124, but it is also possible to drive the concrete pump superstructure 101 together with the combustion drive engine 103 and the electric motor 124. The hydraulic pumps 115, 117, 118, 119 are driven by a transfer case that is optionally driven by the power take-off 123 of the gearbox 129 of the combustion drive engine 103 or the electric motor 124. When the electric motor 124 is used during set-up and dismantling of the truck-mounted concrete pump 100, it must also drive the hydraulic pump 115, even though the concrete pump 111 is not being operated at that time. Driving the hydraulic pump 115 in idle operation also consumes a great deal of energy, so that set-up and dismantling would also unnecessarily quickly discharge an electrical energy storage device arranged on the truck-mounted concrete pump 100 to supply the electric motor 124.

FIG. 4*a* shows a drive scheme of a truck-mounted concrete pump 100 according to the invention in a first embodiment. The truck-mounted concrete pump 100 (see FIG. 1) has a truck chassis 104 with a combustion drive engine 103 for transporting the truck-mounted concrete pump, and a hydraulically driven concrete pump superstructure 101 (see FIG. 1). In addition, the truck-mounted concrete pump has a distribution boom 107, a support system 108, and a concrete pump 111 for pumping and distributing fresh concrete. Further, the truck-mounted concrete pump comprises hydraulic pumps 115, 117, 118, 119 configured to drive the concrete pump superstructure 101, wherein at least one hydraulic pump 115 is configured to drive the concrete pump 111 and another hydraulic pump 119 is configured to drive the distribution boom and/or the support system 108. The combustion drive engine 103 of the truck is configured to drive the hydraulic pump 115 to drive the concrete pump 111. An electric motor 124 is configured to drive the hydraulic pump 119 configured to drive the distribution boom and/or the support system 108.

The combustion drive engine 103 is connected to a gearbox 129 and when the vehicle is in motion, for example, traveling to and from a job site, the wheels of the chassis are driven by the cardan shaft 114. Once the truck-mounted concrete pump 100 arrives at the job site and is positioned, the combustion drive engine 103 can be shut off.

During the set-up of the truck-mounted concrete pump 100, the truck-mounted concrete pump 100 is first supported by extending or folding down the support struts 141 and extending the support system cylinders 109 of the support system 108. For this support operation, the hydraulic pump 119 is driven by the electric motor 124 and the hydraulic oil is supplied to the support 108 via the first hydraulic switching unit 130 and a hydraulic control system not shown for clarity. After the truck-mounted concrete pump 100 is properly supported, the distribution boom 107 is unfolded. For this purpose, the first hydraulic switching unit 130 is switched over to the operation of the distribution boom 107. In an alternative embodiment not shown, the electric motor 124 drives a shortened hydraulic pump train with separate hydraulic pumps for driving the support system 108 and driving the distribution boom 107. The first switching unit 130 would not be required in this alternative embodiment.

Only after the truck-mounted concrete pump 100 has been supported and the distribution boom 107 has been unfolded the combustion drive engine 103 is started for the actual concreting operation and, via the power take-off 123 of the gearbox 129, drives the hydraulic pumps 115, 117 and 118 required for operating the concrete pump 111, the pipe switch 112 and the agitator 113. The distribution boom 107 continues to be driven by means of the electric motor 124 during the concreting operation. After completion of the concreting operation, the combustion drive engine 103 is shut off and the distribution boom 107 is folded in with the aid of the electric motor 124 and then the support system 108 is retracted.

FIG. 4*b* shows a variant of the setup in FIG. 4*a* with two power take-offs 123 of the combustion drive engine 103. On the one hand, the hydraulic pump 119 can be driven electrically by the electric motor 124, for example via a transfer case 135. On the other hand, the boom pump 119 can also be driven by the combustion drive engine 103 via the second power take-off 123 and the transfer case 135. The advantage of this variant would be that the truck-mounted concrete pump 100 can also be driven completely by the combustion drive engine, which would be useful, for example, in the event of a failure of the electrical components or a discharged battery. In addition, the electric motor could then also be used as an electricity generator driven by the combustion drive engine 103 via the power take-off 123. With a coupling between the transfer gearbox 135 and the hydraulic pump 119, a battery can be charged using the generator functionality of the electric motor 124 without also driving the hydraulic pump 119.

FIG. 5 shows a drive scheme for an alternative embodiment of the invention. In this embodiment, the hydraulic pump 117 for driving the pipe switch 112 and the hydraulic pump 118 for driving the agitator 113 are driven by the electric motor 124 via the hydraulic pump 119. This has the advantage that after the concreting process, with the combustion drive engine 103 still switched off, the pipe switch 112 and the agitator 113 can be moved for cleaning concrete residues, for example with a high-pressure cleaner, in order to easily reach all components for cleaning.

FIG. 6 shows a drive scheme for a further alternative embodiment of the invention, in which a further or second hydraulic switching unit 131 is provided, with which the hydraulic pump 119 can be connected to the concrete pump 115. This has the advantage that, in the cleaning operation shown in connection with FIG. 4, the hydraulic differential cylinders of the concrete pump 111, which are not shown, can also be operated electrically. For the actual concrete conveying operation, the working power provided by the combustion drive engine 103 is necessary for driving the concrete pump 111, i.e. in particular for the differential cylinders. For cleaning the concrete pump 111, and in particular for removing residual concrete from the conveying pipe, a cleaning ball is usually sucked back over the conveying pipe or pushed through the conveying pipe with water. The energy requirement for this type of cleaning of the conveying line is comparatively low compared to the concrete distribution process, so that an electric motor 124 with a relatively low power connection, which would not be sufficient for the concreting operation, can also be used for the entire cleaning process and the combustion drive engine 103 can also remain switched off during this time. In the embodiment example shown in FIG. 6, the hydraulic pumps 117 or 118, which are also driven by the electric motor 124, could alternatively be used to drive the concrete pump 111, or the differential cylinders of the concrete pump 111, during the cleaning operation.

In FIGS. 4*a*, 4*b*, 5 and 6, the electrical power supply for the electric motor 124 has been omitted for clarity. This electrical power supply for the electric motor 124 is explained in more detail below.

FIG. 7 shows in simplified form the drive according to FIGS. 5 and 6, in which the hydraulically driven units of the concrete pump superstructure 101 are not shown for reasons of clarity. The electric motor 124 is connected to an electrical switching device 133 for power supply, which alternatively or also simultaneously establishes a connection 122 to a site power supply or to an electric energy storage 120. The electrical energy storage 120, which may have a relatively small capacity because the electric motor 124 does not drive the concrete pump 111 for concrete pumping operation, is preferably arranged on the concrete pump superstructure 101 or on the truck chassis 104. Additionally, a generator 132 is arranged on the concrete pump superstructure 101 to be driven by the combustion drive engine 103, for example via the power take-off 123. The generator 123 is connected to the hydraulic pump 115 via a disengageable coupling 134. With this arrangement, the generator 132 can charge the electrical energy storage device 120 via the switching device 133 when the auxiliary drive 123 is engaged, for example, during trips to and from the construction site or during breaks in concrete conveying. Alternatively, the generator 132 can also ensure emergency operation of the distribution boom 107 and the outrigger 108 by means of the combustion drive engine 103 if no electrical energy storage 120 is available or if it is discharged, or if no construction site power supply is available.

The addition of a second power take-off 123 and a transfer case 135 to the drive, as shown in FIG. 4*a*, can also be applied to the embodiments of the invention corresponding to FIGS. 5, 6 and 7, in which case the separate generator 132 of FIG. 7 would no longer be necessary.

In further variants, the combustion drive engine 103 could drive the concrete pump 111 and the pipe switch 112 during the pumping operation. The agitator 113 is driven by the electric motor 124, as shown in FIG. 5, but could also be driven directly by an electric motor, bypassing the hydraulic drive, as could other equipment of the truck-mounted concrete pump 100 in some circumstances.

In order to switch off the combustion drive engine 103 during pumping breaks, i.e. when waiting for the next truck mixer with fresh concrete, for example, a variant is conceivable in which the boom 107, the support system 108 and the agitator 113 are driven by the electric motor 124 and the hydraulic pumps 118 and 119. The hydraulic pump 117 for driving the pipe switch 112 would then be coupled to the combustion drive engine 103 via the hydraulic pump 115.

Instead of the generator 132 shown here, a generator (e.g., an alternator) associated with the truck 102, for example, or a generator that is not driven by the power take-off 123 can also be used to charge the electrical energy storage 120 while the combustion engine 103 is running.

FIGS. 8*a* through 8*e* illustrate various on-site power supply options that can be used as an alternative for powering the electric motor 124.

Figures 8A, 8B, 8C, 8D, 8E:
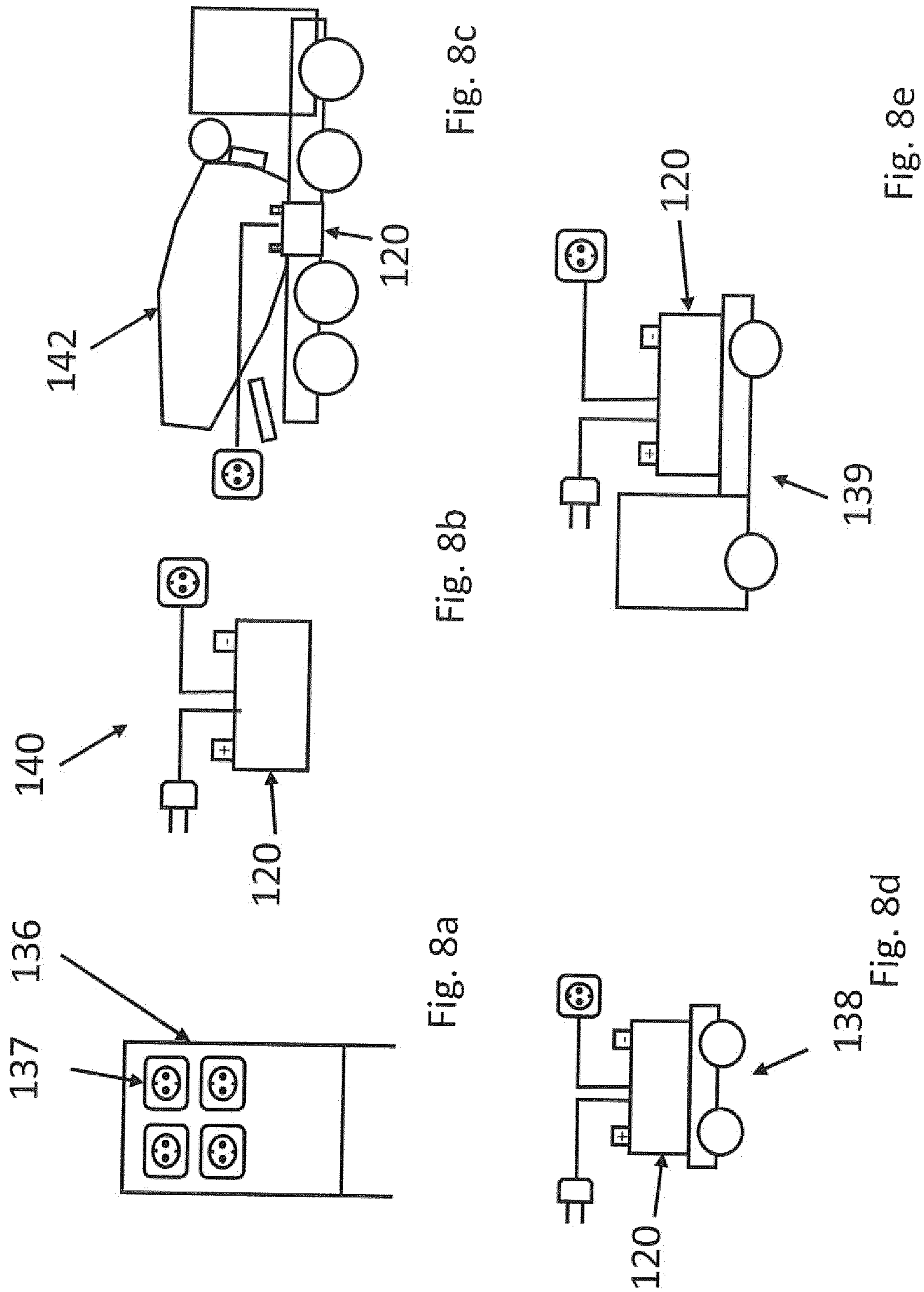

FIG. 8*a* shows an electrical distribution box 136 commonly used on construction sites with several power sockets 137, which supplies the site with different voltages (e.g. 240V and 400V). Depending on the size of the truck-mounted concrete pump, a common 240V power supply may be sufficient to drive the distribution boom 107 or the support system, alternatively, a 400V three-phase power supply with a common power rating may be used.

FIG. 8*b* shows an electrical energy storage 120 present at the construction site, which is suitable for supplying power to various electrically driven working machines at the construction site. A plug can be used to charge the electrical energy storage unit, for example, from the electrical distribution box 136. Such an electrical energy storage on the construction site is thus particularly suitable for providing sufficient electrical power during power consumption peaks in addition to the power from the electricity distribution box 136.

FIG. 8*c* shows a known truck mixer 142 equipped with an electrical energy storage 120. This allows the truck mixer to simultaneously provide electrical power to drive the electric motor 124 of the concrete pump superstructure 101 when discharging the fresh concrete into the feed hopper 116. In addition, for example, the electrical energy storage 120 of the concrete pump superstructure 101 can be charged.

FIG. 8*d* shows an electrical energy storage 120 disposed on a trailer 138. The trailer 138 can, for example, be coupled to the truck-mounted concrete pump 100 and thus towed to the construction site.

In FIG. 8*e*, an electrical energy storage 120 is mounted on a van 139 to provide sufficient electrical driving power at the job site, particularly when no other job site power supply is available at a job site.

In any of the above embodiments, the electrical energy storage 120 may be, for example, a rechargeable battery. Also, a fuel cell suitable for power supply or also other known types of power supply can be used for supplying the electric motor 124.

The electric motor 124 can be designed as a direct current or alternating current motor. For reasons of clarity, the drawings do not show the DC/AC components and other control components required depending on the electric motor 124 used.

LIST OF REFERENCE NUMERALS

100 truck-mounted concrete pump
101 concrete pump superstructure

102 truck
103 truck drive engine
104 truck chassis
105 truck frame
106 turntable
107 distribution boom
108 support system
109 support cylinder
110 articulated joint drive
111 concrete pump
112 pipe switch
113 agitator
114 cardan shaft
115 hydraulic pump concrete pump
116 feed hopper
117 hydraulic pump pipe switch
118 hydraulic pump agitator
119 hydraulic pump boom/support system
120 electrical energy storage concrete pump superstructure
121 transfer gearbox
122 construction site power supply
123 power take-off (PTO)
124 electric motor
125 articulated joint
126 boom segments
127 concrete pump substructure
128 hydraulic pump train
129 gearbox combustion drive engine
130 first hydraulic switching unit boom/support system
131 second hydraulic switching unit concrete pump
132 generator
133 electrical switching device
134 coupling
135 transfer gearbox
136 electricity distribution box
137 power socket
138 trailer with electrical energy storage
139 van with electrical energy storage
140 construction site accumulator
141 support struts
142 truck mixer

The invention claimed is:

1. A truck comprising:

a truck chassis having a combustion drive engine, the combustion drive engine is configured to operate a concrete pump mounted on the truck;

a concrete pump system that is hydraulically driven and that includes a distribution boom, a support system, and the concrete pump;

a first hydraulic pump configured to drive the concrete pump;

a second hydraulic pump configured to drive the distribution boom and/or the support system;

a hydraulic switch configured to connect the distribution boom and the support system alternately to the second hydraulic pump; and an electric motor, wherein the combustion drive engine is configured to drive the first hydraulic pump, wherein the second hydraulic pump is configured to be driven only by the electric motor.

2. The truck of claim 1, wherein the combustion drive engine is configured to drive a third hydraulic pump which is configured to drive a pipe switch.

3. The truck of claim 1, wherein the combustion drive engine is configured to drive a third hydraulic pump which is configured to drive an agitator.

4. The truck of claim 1, wherein the electric motor is configured to drive a third hydraulic pump which is configured to drive a pipe switch.

5. The truck of claim 1, wherein the electric motor is configured to drive a third hydraulic pump which is configured to drive an agitator.

6. The truck of claim 1, further comprising a hydraulic switch connecting the second hydraulic pump to the concrete pump.

7. The truck of claim 1, wherein the electric motor is supplied with power via an electrical switch.

8. The truck of claim 7, wherein the electrical switch is configured to connect an electrical energy storage to the electric motor.

9. The truck of claim 7, wherein the electrical switch is configured to connect a construction site power supply to the electric motor.

10. The truck of claim 1, wherein the combustion drive engine is configured to drive a generator.

11. The truck of claim 10, wherein the generator is connected via a coupling to the first hydraulic pump.

12. The truck of claim 10, wherein the generator is configured to drive the electric motor.

* * * * *